(No Model.)

G. COPE.
CANVAS STRETCHING DEVICE.

No. 424,095. Patented Mar. 25, 1890.

WITNESSES:
David S. Williams
Joshua Matlack, Jr.

INVENTOR:
George Cope
by his attorneys
Francis T. Chambers

UNITED STATES PATENT OFFICE.

GEORGE COPE, OF WEST CHESTER, PENNSYLVANIA.

CANVAS-STRETCHING DEVICE.

SPECIFICATION forming part of Letters Patent No. 424,095, dated March 25, 1890.

Application filed December 3, 1889. Serial No. 332,414. (No model.)

*To all whom it may concern:*

Be it known that I, GEORGE COPE, of West Chester, county of Chester, State of Pennsylvania, have invented a new and useful Canvas-Stretching Device, of which the following is a true and exact description, reference being had to the accompanying drawings, which form a part of this specification.

My invention relates to devices for stretching canvas on frames, and has for its object to provide a complete and effective appliance for bracing and adjusting the sides of the frame so as to tighten and maintain in proper tension the canvas secured to them. My invention will be best understood after a description of the drawings in which it is illustrated, and in which—

Figure 1:
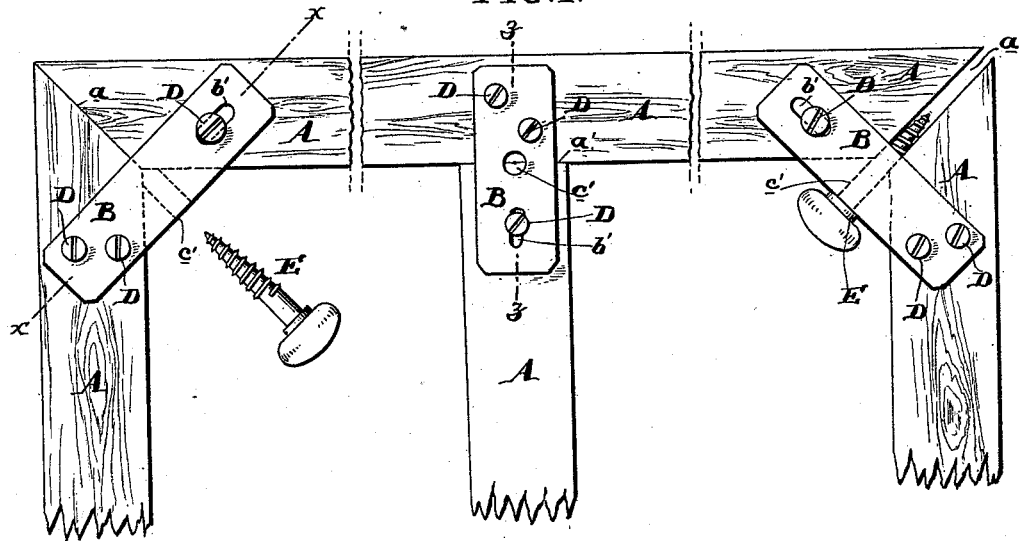
Figure 2:
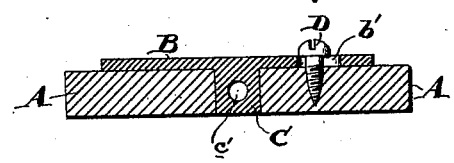
Figure 3:
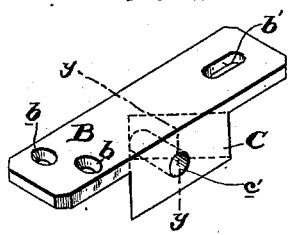
Figures 4, 5:
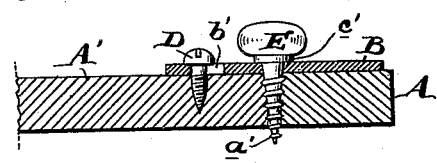

Figure 1 is a plan view of part of the canvas-stretching frame with my improved appliances secured upon it. Fig. 2 is a section on the line $x\ x$ of Fig. 1; Fig. 3, a perspective view of my device in the form in which I prefer to construct it; Fig. 4, a section on the line $y\ y$ of Fig. 3, and Fig. 5 a section on the line $z\ z$ of Fig. 1.

A A A are connected parts of the frame upon which the canvas is stretched. As shown, the parts of the frame are united at the corners by beveled joints $a$, and my preferred construction is especially adapted for use with such beveled joints.

A' is a brace such as is in large pictures used to stiffen the frame, and $a'$ indicates the joint which it makes with connected parts A of the frame.

B is a brace-plate, which serves to brace the joint, made by two connected pieces of the frame. At one end it is provided with a screw-hole or holes $b$, and at the other with a slot $b'$, and the plate is connected, as shown, so that the slot will lie at right angles to the joint formed by connected parts of the frame. This construction and mode of application permit one part of the frame to move away from its connected part in a direction at right angles to the joint formed between them. In the brace-plate I form a perforation $c'$ at a point which comes immediately over the line of the joint, said perforation being of sufficient dimensions to permit of the insertion through it of a tapered screw E, and its function being to properly align and guide the said screw. When used in connection with a joint such as or similar to $a'$, the perforation is formed directly through the body of the plate, as is shown best in Fig. 5; but where my device is intended for use on a beveled joint such as $a$, I form upon the plate B a downwardly-extending gage-lug, C in the form of a right-angle triangle, with its right angle arranged as shown, so as to fit in the angle formed by two connecting parts A of the frame, and I form the perforation $c'$ through this gage-lug and in line with the beveled joint $a$.

D D are screws by which the brace-plate B is secured to the parts A of the frame; E, a tapered screw of dimensions, which will permit it to pass through the perforation $c'$ and preferably fit neatly in it in its larger portions.

The brace-plate is secured to the two adjacent parts of the frame, as shown, so that its slot $b'$ will be at right angles to the joint. In itself it stiffens and braces the frame, and when provided with a downwardly-extending gage-lug C nicely gages the position of the adjacent parts A and holds them with great rigidity and firmness. The tapered screw E is then inserted through the perforation $c'$ and screwed into the joint, which it forces apart, the adjacent parts of the frame moving away from each other in a direction perpendicular to the line of the joint and being always braced and held in proper relative position by the plates D. The tension of the canvas can thus be nicely adjusted and readjusted at any time when it may become necessary, the brace-plates and screws remaining as a permanent part of the frame.

As shown in the drawings, the tapered screws E are represented as thumb-screws; but any ordinary screw can be used in the same way.

Having now described my invention, what I claim as new, and desire to secure by Letters Patent, is—

1. In a canvas-stretching device, a brace-plate having a slot at one end and a screw hole or holes at the other end for securing it to connected parts of the frame, and having also a perforation formed in it so as to come in line with the frame-joint and serve as a guide for a tapered screw, all substantially as and for the purpose specified.

2. In a canvas-stretching device, a plate B, having a slot at one end and a screw hole or holes at the other end for securing it to connected parts of the frame, in combination with the perforated gage-lug C, secured to the plate and extending down therefrom so as to fit in the angle of the frame and serve as a guide for a tapered screw, all substantially as and for the purpose specified.

3. In a canvas-stretching device, a plate B, having a slot at one end and a screw hole or holes at the other end for securing it to connected parts of the frame, in combination with the perforated gage-lug C, secured to the plate and extending down therefrom so as to fit in the angle of the frame, and a tapered screw E, adapted to pass through the perforated lug and into the joint of the frame, all substantially as and for the purpose specified.

GEO. COPE.

Witnesses:
D. M. McFARLAND,
WM. P. MERCER.